United States Patent Office 2,970,012
Patented Jan. 31, 1961

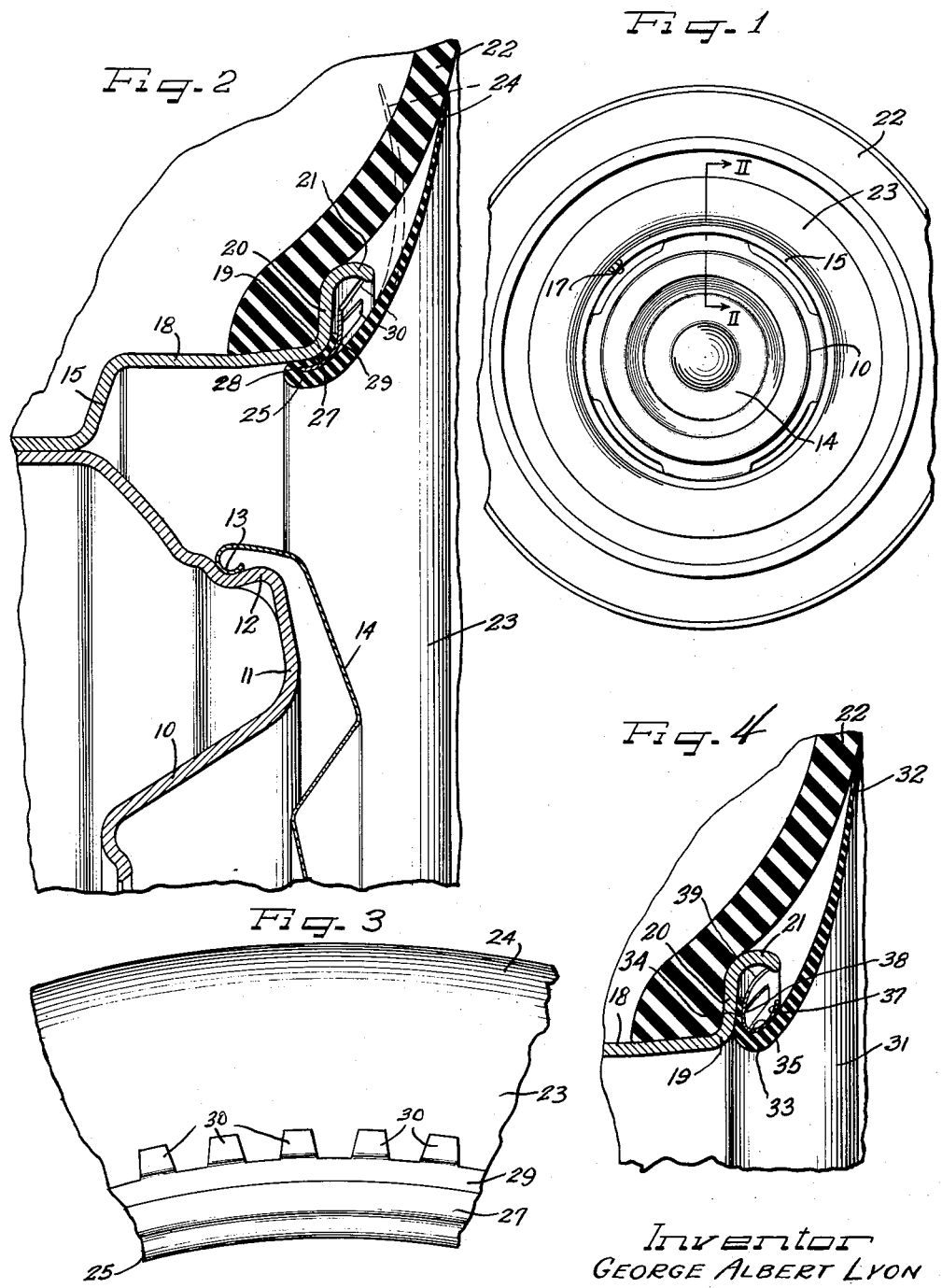

2,970,012
WHEEL COVER
George Albert Lyon, 13881 W. Chicago Blvd., Detroit 28, Mich.
Filed Nov. 12, 1957, Ser. No. 695,590
6 Claims. (Cl. 301—37)

The present invention relates to improvements in wheel structures and more particularly concerns the provision of novel means for providing a wheel with a simulated white or other colored sidewall for a tire on the wheel.

For ornamental purposes, automobile tires are commonly provided with white sidewalls, the remainder of the tire being of a more or less black appearance. The white rubber used for the white sidewall is applied as a veneer and is of a different composition from the remainder or body of the tire and actually requires a different vulcanizing treatment to the extent that the temperature and time of cure are somewhat different than for the black rubber of the tire body. This has created some necessity for compromise in the vulcanization of tires with white sidewalls, generally resulting in a sacrifice of quality in the body of the tire including the tread and principal sidewall portions thereof.

To overcome the disadvantages of cure compromise, it has been proposed to secure the white sidewall portion or veneer to the sidewall of the tire after the tire has been vulcanized. Such after-attached sidewall members are inherently liable to such disadvantages as peeling, and the like, and of course require a separate attaching or vulcanizing operation that raises costs.

It has also been heretofore proposed to provide separate simulated white sidewall ring members that are secured clampingly between the terminal flange of the tire rim and the bead portion of the tire and separably hug the sidewall of the tire. Such simulated or mock tire white sidewall rings require, of course, that the tire be deflated in order to install the ring members. Should such simulated white sidewall rings become damaged, it is necessary to deflate the tire not only to remove the damaged ring but also to replace the ring. Furthermore, a disadvantage of such simulated white sidewall rings is that, especially with tubeless tires, there is interference with proper sealing, gripping engagement of the tire bead portion with the opposing surfaces of the tire rim and more particularly the terminal flange between which and the tire bead the simulated white sidewall ring is clampingly interposed.

It is accordingly an important object of the present invention to overcome the foregoing difficulties and disadvantages of the prior expedients and to provide a simulated tire sidewall of improved appearance and which can be applied, or removed, or replaced without disturbing the tire.

Another object of the invention is to provide an improved tire sidewall simulating member which serves also as means for covering the tire rim terminal flange as well as wheel balancing weights that may be carried by such flange.

A further object of the invention is to provide a novel tire sidewall simulating ring member, which is adapted to be so related to the outer side of the tire and the tire rim that the tire is afforded a deeper, more massive appearance.

Still another object of the invention is to provide a novel tire sidewall simulating ring member or assembly which is adapted for optional assembly with a wheel.

Yet another object of the invention is to provide a tire sidewall simulating flexible, non-metallic ring member which is adapted to be carried in clamped engagement with the outer side of a tire rim.

It is also an object of the invention to provide a non-metallic tire sidewall simulating ring device affording substantial possibilities for variable, distinctive ornamental effects.

Other objects, features and advantages of the present invention will be readily apparent from the following detailed description of certain preferred embodiments thereof, taken in conjunction with the accompanying drawing, in which:

Figure 1 is an outer side elevational view of a wheel structure embodying features of the invention;

Figure 2 is an enlarged fragmentary radial sectional detail view taken substantially on the line II—II of Figure 1;

Figure 3 is a fragmentary rear elevational view of the tire sidewall simulating ring assembly of Figure 2 looking toward the inner side of the assembly; and Figure 4 is a fragmentary radial sectional detail view similar to Figure 2 but showing a modification of the sidewall ring device.

Having reference to Figures 1, 2 and 3, a wheel structure is shown including a wheel body 10 having an intermediate annular axially outwardly projecting nose bulge 11. On the radially outer side of the nose bulge is a circumferentially spaced plurality of generally radially outwardly projecting hub cap retaining bumps or projections 12 over which a marginal retaining bead 13 of a hub cap 14 is adapted to be snapped in press-on, pry-off relation for retaining the hub cap over the central portion of the wheel.

At its outer margin, the wheel body 10 is attached to and supports a tire rim of the multi-flange, drop-center type including an outer side flange 15 carrying a valve stem 17. Extending generally axially outwardly from the side flange 15 is an intermediate flange 18 that merges on a rounded annular shoulder 19 with a terminal flange having a generally radially outwardly extending portion 20 and a terminal, lip portion 21. A pneumatic tire 22 of the tubeless type is adapted to be carried by the tire rim.

In order to afford the ornamental appearance of the tire sidewall extending to a greater extent radially inwardly than normally permitted in view of the overlap of the terminal flange 20, 21 with the bead portion of the tire 22, and in order to afford, where desired, a white sidewall appearance for the tire or the appearance of the sidewall of the tire having any other preferred practicable decorative color, a sidewall simulating ring extension member 23 is provided. This ring member is of a non-metallic rubber-like material such as synthetic rubber of which butyl is one preferred form for this purpose. The sidewall ring member 23 is provided in a diameter to extend from overlapping relation to the tire sidewall from a point substantially radially outwardly beyond the terminal flange lip portion 21 to an inner diameter enabling the sidewall ring member to overlie the tire rim terminal flange and in this instance a portion of the tire rim radially inwardly from the terminal flange.

In a preferred form, the sidewall ring member 23 is of generally concave-convex shape more or less complementary to the axially outwardly bulging arcuate shape of the tire sidewall. Cross-sectionally, the body thickness of the ring member 23 is such as to afford greatest resilient deflectability in the radially outer marginal portion thereof and for this purpose such outer marginal portion is constructed to provide an edge that is, in this instance, generally feathered to its tip extremity as indicated at 24. From the tip extremity 24, the body of the ring member 23 gradually thickens to afford strength and stability and retentive qualities for the ring member. In order to enable the ring member 23 to engage the tire sidewall in hugging, self-positioning tensioned relation for following flexibly any changes in shape or movement of the tire sidewall in service, the body of the ring member 23 is constructed for normally assuming a more axially inward position of the radially outer portion thereof with respect to the radially inner portion thereof as indicated in dash outline in Figure 2. Thereby, when the ring member is applied to the outer side of the wheel in the manner now to be described, the ring member is caused to be substantially resiliently flexed from the dash outline condition to the full outline condition shown for constant resilient flexible thrust in face-to-face relation at its edge portion 24 against the tire rim sidewall.

At its radially inner margin, the ring member 23 is provided with means for retaining it on the wheel and more particularly in clamped engagement against the tire rim. To this end, the ring member 23 has an inner generally axially inwardly extending thickened marginal terminal portion 25 which is dimensioned to be disposed in generally telescoped relation within the axially outer marginal portion of the intermediate tire rim flange 18. As an integrally molded extension from the thickened inner margin 25 a relatively thinner annular return directed flange 27 is provided behind the inner marginal portion and is adapted to engage conformably in bottomed, seated relation upon the juncture shoulder 19 of the tire rim. Between the marginal portion 25 and the flange 27 is provided a slot-like annular groove 28 within which is snugly, conformably disposed a retaining member 29 which is preferably made from sheet or strip material, preferably metal which may be stamped or rolled into shape.

While the retaining member 29 may be a continuous annular ring, it may also comprise a discontinuous or sectional member, with a circumferential series of such members carried by the ring member 23 and coacting therewith to retain the same on the wheel. At least the radially inner portion of the body of the retaining member 29 is preferably curvingly cross-sectionally shaped generally complementary to the shoulder 19 of the tire rim so as to conformably clamp the sidewall ring member inner marginal turn-back flange 27 firmly over the maximum opposed area of the rim shoulder 19 and the adjacent portions of the intermediate flange 18 and terminal flange section 20 that join in the shoulder 19.

For retaining the ring retaining member 29 in its clamping relationship to the tire rim, the radially outer edge of the member 29 is provided with means for interengagement with the terminal flange of the tire rim and more particularly the lip portion 21 thereof. To this end, a series of circumferentially spaced generally radially and axially outwardly oblique retaining fingers 30 are provided as integral extensions from the radially outer edge of the member 29 and are constructed and arranged to engage under resiliently tensioned thrusting more or less biting retaining engagement with the inner side of the axially outer portion of terminal flange lip portion 21. Where, as shown, the lip portion 21 is of generally curved shape it provides an overhanging generally radially and axially inwardly facing shoulder enabling quite effective retaining engagement thereof by the fingers 30 and assuring that in service vibrations and jarring will actually act to, if anything, drive the retaining member 29 ever more effectively clampingly against the sidewall ring member flange 27, by tendency of the retaining fingers 30 to cam axially inwardly along the terminal flange lip shoulder. Although the retaining fingers 30 may, if preferred, comprise a continuous and uninterrupted circumferential series, by preference, they are disposed in spaced groups of a plurality of such fingers, five being shown in Figure 3. This leaves substantial space between the groups of fingers for accommodating wheel balancing weights in the chamber defined between the terminal flange of the tire rim and the overlying spaced portion of the ring member 23.

It will be observed that the ring member flange 27 and the retaining member 29 cooperate to provide, in effect, an annular generally radially outwardly and axially inwardly opening groove into which the rim shoulder 19 fits. By this relationship, effective resistance to pulling of the ring 23 out of its retained position on the wheel is attained. Even greater resistance to pull-out of the ring member may be attained by molding the retaining member 29 directly into engagement with the radially inner portion of the generally cross-sectionally hook-shaped ring member 23, rather than having the retaining member 29 inserted into a preformed socket defined between the turn-back marginal flange and the thickener inner margin of the ring member.

In applying the ring member 23 to the outer side of the wheel, it is generally centered with respect to the wheel and the retaining member 29 pressed axially inwardly, either by pressure against the axially outer side of the inner marginal portion 25 of the ring member 23, or by flexing the ring member open to gain direct access to the body of the retaining member 29. In the application of the axially inward pressure against the assembly, and more particularly the retaining member 29, the retaining fingers 30 are cammed over the tip of the terminal flange lip 21 from a slightly greater diameter of the tips of the fingers than the inside diameter of the terminal flange lip, until the fingers snap past the flange tip and enter into edgewise tensioned retaining engagement with the shoulder provided by the terminal flange lip. It may not be necessary to remove the sidewall ring assembly, either for tire changes or changing or rotating of the wheels. In such case the sidewall ring assembly may remain as a more or less permanent fixture on the tire rim. On the other hand, if it is desired to remove the sidewall ring assembly, that can be accomplished by flexing the ring member 23 open, that is away from the sidewall of the tire 22 and inserting a pry-off tool such as a screwdriver between the retaining fingers 23 and applying pry-off force which will flex the retaining member 29 and more particularly the retaining fingers 30 thereof resiliently out of the retaining engagement with the terminal flange lip 21.

In the modification of Figure 4, the wheel inclusive of the tire rim and the tire are identical with the disclosure in Figure 2 and therefore identical reference numerals have been applied to identify similar parts. However, in this form of the invention, a sidewall simulative non-metallic ring member 31 is provided which, in general, is similar to the ring member 23, in that it has a feathered radially outer tip 32 and a body which is of gradually greater thickness toward its radially inner margin, and functions substantially the same as described in connection with the ring member 23 and may be made from the same material.

However, in the modification of Figure 4, a slightly different retaining arrangement for the ring member 31 is disclosed. To this end, the ring member 31 is provided with a thickened inner margin 33 of a diameter to overlie the intermediate flange 18 and more particularly the rim shoulder 19. Extending generally radially outwardly from the inner margin 33 is a preferably continuous annular flange 34 adapted to lie in seated, bottomed relation against the radially inner portion of the terminal flange section 20 and more particularly the adjacent portion of the rim shoulder 19. This turned-back flange 34 provides with the overlying inner marginal portion of the ring member 31 a groove 35 that opens generally radially outwardly and is receptive therein of a generally curved or loop flange radially inner portion 37 of a retaining member 38 which may be either a continuous ring or a plurality of segments similarly as the retaining member 29, and is provided with a circumferential series of generally radially and axially outwardly extending retaining teeth 39 that are engageable in tensioned retaining biting resiliently thrusting relation against the shoulder provided by the inwardly turned axially outer extremity of the terminal flange lip 21. In the assembled relationship as shown, the retaining member 38 thrusts generally axially inwardly against the flange 34 and thus clamps the same against the tire rim with a substantially snubbing action. The retaining fingers 39 may be provided in circumferentially spaced groups if preferred. Application and removal of the ring member 31 and the retaining member 38 is effected similarly as described in connection with the ring member 23.

It will be understood that modification and variations may be effected without departing from the scope of the novel concepts of the present invention.

I claim as my invention:

1. In a wheel structure including a multi-flange tire rim including an intermediate flange and a terminal flange having a generally radially extending portion joining the intermediate flange on a rounded shoulder, a tire sidewall simulating non-metallic ring having a radially outer margin for engagement with the sidewall of a tire on the rim and a radially inner portion for overlying the terminal flange and at least the adjacent portion of the intermediate flange, and a member interlocked with said radially inner portion and retainingly engaging the terminal flange for retaining the ring on the wheel, said radially inner portion of the ring being conformed generally groove shape to seat on said shoulder between the intermediate and terminal flanges and said member having a portion engaging said radially inner portion of the ring and holding it in the seated relation on said shoulder.

2. In a wheel structure including a tire rim having an intermediate generally radially inwardly facing annular flange joining at its axially outer end a terminal flange extending generally radially outwardly and terminating in a generally axially outwardly extending lip portion and the tire rim adapted to support a pneumatic tire with a sidewall projecting axially outwardly beyond the tip of the terminal flange lip, an annular trim generally simulative of the tire sidewall and comprising a ring member formed from rubber-like material of substantial resilient flexibility, the radially outer edge of the ring member being on a diameter to overlie the tire sidewall spaced from the terminal flange lip and the radially inner margin of the ring member being of a diameter to overlie the terminal flange at least to juncture with the intermediate flange, the radially outer margin of the ring member being thinner and thus substantially more flexible than the radially inner margin of the ring member and the body of the ring member being progressively thicker from said radially outer margin to the radially inner margin whereby the inner marginal portion of the ring member affords strength and stability and retentive qualities for the ring member, the radially inner margin of the ring member having a substantially thinner integral underturned and return directed generally radially outwardly extending flange portion therebehind engageable in bottomed, seated substantially conformed relation upon the radially inner portion of said radially extending terminal flange portion at juncture thereof with the intermediate flange and providing with the overlying thickened radially inner marginal portion of the ring member a generally radially outwardly opening groove of curved cross-sectional form, and a retaining member having a radially inner portion of curved cross-sectional shape conformably engaging in complementary relation within said groove and projecting radially outwardly therefrom, said retaining member having generally radially outwardly extending retaining terminal means thereon retainingly grippingly engageable with the terminal flange lip portion and acting to effect clamping pressure of the groove engaged radially inner portion of the retaining member against said underturned ring member flange to clamp the same against the underlying surface of the tire rim flange.

3. In a wheel structure as defined in claim 2, said radially inner marginal thickened portion of the ring member extending generally axially inwardly alongside the axially outer margin of the intermediate flange and said underturned thinner flange and said radially inner portion of the retaining member being conformed to said axially outer portion of the intermediate flange.

4. In a wheel structure as defined in claim 2, said radially inner portion of the retaining member being permanently secured in the groove in the ring member.

5. A wheel structure as defined in claim 2, wherein said retaining member comprises one of a circumferentially spaced series of such members.

6. In a wheel structure as defined in claim 2, said radially inner portion of the retaining member being turned generally axially outwardly and radially outwardly and affording a curved loop flange positively holding a radially inner marginal portion of the ring member at the axially outer side of said groove spaced from the tire rim terminal flange.

References Cited in the file of this patent

UNITED STATES PATENTS

| | | |
|---|---|---|
| 2,404,388 | Lyon | July 23, 1946 |
| 2,404,389 | Lyon | July 23, 1946 |
| 2,569,482 | Lyon | Oct. 2, 1951 |

FOREIGN PATENTS

| | | |
|---|---|---|
| 1,061,278 | France | Nov. 25, 1953 |